Figure 1:
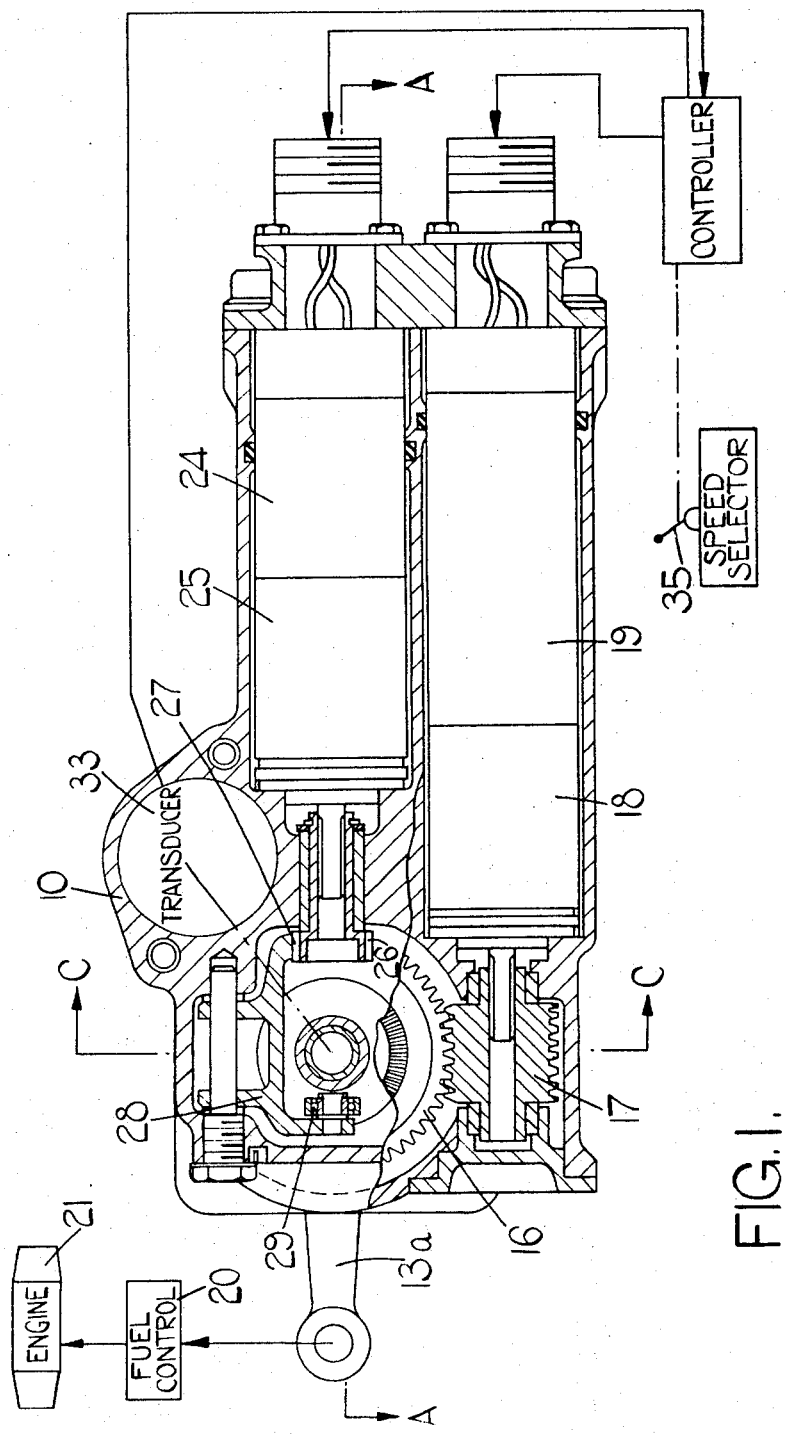

United States Patent [19]

Bloom

[11] 3,861,507
[45] Jan. 21, 1975

[54] ACTUATOR DEVICE FOR USE IN A GAS TURBINE ENGINE FUEL CONTROL SYSTEM

[75] Inventor: Joseph Louis Bloom, Droitwich, England

[73] Assignee: Lucas Aerospace Ltd., Birmingham, England

[22] Filed: July 5, 1973

[21] Appl. No.: 376,435

[30] Foreign Application Priority Data
July 5, 1972  Great Britain.................... 31387/72

[52] U.S. Cl............................. 192/48.5, 192/.02 R
[51] Int. Cl............................................ F16d 21/08
[58] Field of Search................ 244/83; 60/39.28 R; 192/.02, 48.5; 74/625

[56] References Cited
UNITED STATES PATENTS

| | | | |
|---|---|---|---|
| 990,999 | 5/1911 | McGuire et al................... | 192/.02 R |
| 1,423,090 | 7/1922 | Delano............................. | 192/.02 R |
| 2,563,970 | 8/1951 | Sloan et al. ..................... | 192/.02 R |
| 2,621,543 | 12/1952 | Rossmann ....................... | 192/.02 R |
| 3,182,774 | 5/1965 | Basford........................... | 192/.02 R |
| 3,363,480 | 1/1968 | Murphy ........................... | 74/625 |

Primary Examiner—Wesley S. Ratliff, Jr.
Attorney, Agent, or Firm—Holman & Stern

[57] ABSTRACT

An actuator device in accordance with the invention comprises a first angularly movable input member, a second angularly movable input member, an angularly movable output member, dog means for interconnecting the second input member with the output member, resilient means acting to urge the dog means out of interengagement, electromagnetic means for urging the dog means into interengagement and coupling means for interconnecting the first input member and the output member under the influence of said resilient means and arranged so that on de-energisation of the electromagnetic means when the output member is out of a datum position thereof the coupling means can be caused to be engaged to connect the output member to the first input member by turning of the first input in one direction to a datum position corresponding to the datum position of the output member and then turning the first input member in the opposite direction, and the arrangement being such that said dog means does not become fully disengaged until the first input member has been tunred in said opposite direction to a position corresponding to the position of the output member.

6 Claims, 6 Drawing Figures

ACTUATOR DEVICE FOR USE IN A GAS TURBINE ENGINE FUEL CONTROL SYSTEM

This invention relates to an actuator device for use in a gas turbine fuel system.

An actuator device in accordance with the invention comprises a first angularly movable input member, a second angularly movable input member, an angularly movable output member, dog means for interconnecting the second input member with the output member, resilient means acting to urge the dog means out of interengagement, electromagnetic means for urging the dog means into interengagement and coupling means for interconnecting the first input member and the output member under the influence of said resilient means and arranged so that on de-energisation of the electromagnetic means when the output member is out of a datum position thereof the coupling means can be caused to be engaged to connect the output member to the first input member by turning of the first input in one direction to a datum position corresponding to the datum position of the output member and then turning the first input member in the opposite direction, and the arrangement being such that said dog means does not become fully disengaged until the first input member has been turned in said opposite direction to a position corresponding to the position of the output member.

Figure 2:
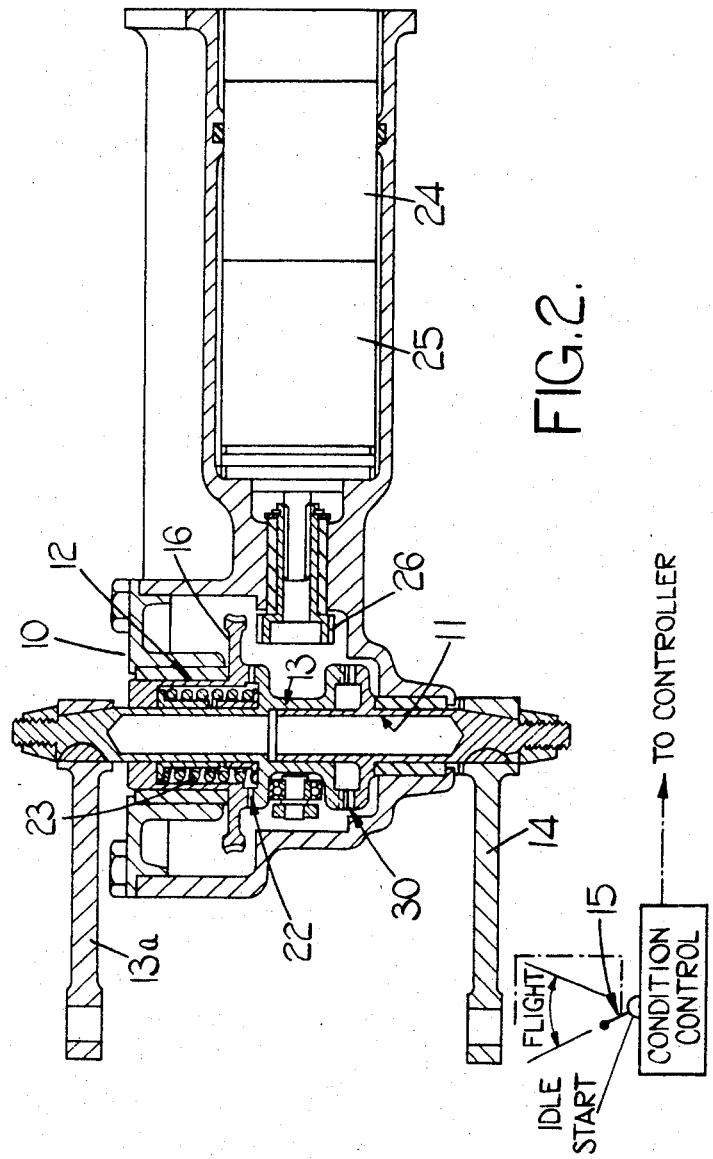
Figure 3:
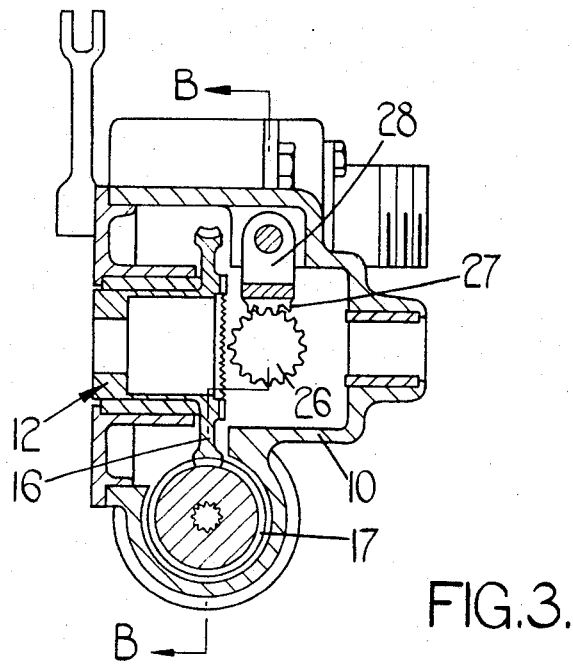
Figure 4:
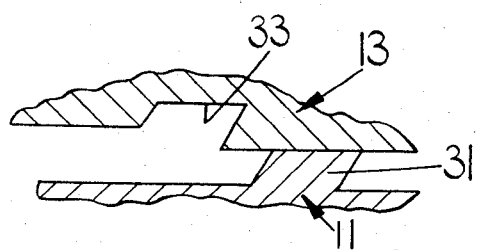
Figure 5:
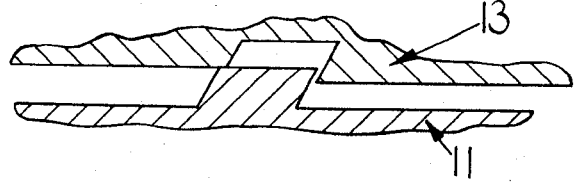
Figure 6:
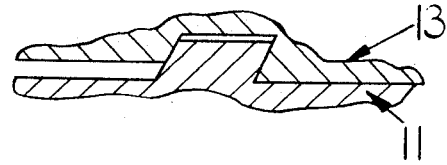

In the accompanying drawings:

FIG. 1 is a diagrammatic representation of an example of the invention showing the actuator device in section (in fact on line B–B in FIG. 3), FIG. 2 is a section on line A–A in FIG. 1, FIG. 3 is a section on line C–C in FIG. 1 with some parts omitted for clarity, and FIGS. 4 to 6 are fragmentary sections through a coupling means forming part of the actuator device.

The actuator device shown comprises a body 10 which is, in fact, in several parts, a first input member in the form of a spindle 11 mounted on the body for angular movement, a second input member 12 mounted in the body for angular movement co-axially with the spindle 11 and an output member 13 rotatably mounted in a bore in the second input member 12 and axially slidable relative thereto.

The spindle 11 has an arm 14 attached to it, which is connected, in use, to a condition control level 15 the purpose of which will be explained hereinafter. The second input member 12 includes a wormwheel 16 which engages a worm 17 on the output shaft of a reduction gearbox 18 driven by a motor 19 incorporating a tachogenerator for speed control of the motor.

The output member 13 has an arm 13a on it which is connected, in use, to a fuel controlling valve 20 which in turn controls the rate at which fuel is supplied to an associated gas turbine engine. Dog means 22 are provided on the member 12 and 13, for drivingly interconnecting these when the member 13 is displaced upwardly as viewed in FIG. 2. Such dog means comprises conventional straight-side dogs on the members 12 and 13.

The member 13 is provided with resilient means in the form of a spring 23 acting on the member 13 to urge the dog means out of engagement. To oppose the spring 23 and urge the dog means into interengagement there is provided an a.c. induction motor 24 which acts through a reduction gear box 25 to drive a pinion 26 meshed with a gear segment 27 on a pivoted member 28. A roller on member 28 engages the member 13 to urge it upwardly as viewed in FIG. 2, when the motor 24 is energised. The motor 24 is thus normally maintained in a stalled condition urging the member 13 into driving engagement with member 12.

Coupling means 30 are provided for connecting the member 13 to the member 11 when the motor 24 is de-energised. Such coupling means comprises a dog 31 on the member 11, which is not a simple straight sided dog like those of the dog means 22, but which has leading and trailing sides which are both inclined in the same direction and at the same angle to the rotary plane of the face of the member 11. The member 13 has a slot 32 with similarly inclined sides and this slot coincides with a step in the surface of the member 13, so that when the dog 31 engages the member 13 on one side of the slot 32 (as shown in FIG. 4) the member 13 will be displaced axially relative to the position it occupies when the dog 31 engages the member 13 on the other side of the slot (as shown in FIG. 5).

The dimensions of the member 13 and of the dog means 22 and the coupling means 30 are such that the dog means 22 will remain engaged when the coupling means 30 is as shown in FIGS. 4 or 5 and only becomes fully disengaged when coupling means occupies the position shown in FIG. 6 with the dog 31 in the slot 32.

The output member 13 is connected by a linkage (not shown) to a position transducer 33 mounted in the body. The system is controlled by an electronic controller 34 which receives inputs from the condition control 15, from a speed selector lever 35, from the transducer 33 and from the engine 21. The controller, the details of which do not form the subject of this application provides an output to drive the motor 19 and another output to energise the motor 24, thereby engaging the dog means 22 and positioning the output member 13 at an appropriate position to ensure that the proper amount of fuel is supplied to the engine 21.

The condition control 15 has a start position, an idle position and a range of flight positions, the levers 15 and 35 being ganged together. In the start and idle positions the motor 24 is de-energised and the coupling means 30 is as shown in FIG. 6. When the condition control is in the flight range, however, the motor is energised so that the position of the output member 13 is entirely determined by position of the second input member 12.

In the event of an electrical failure, or when certain unsafe conditions detected by the controller 34 obtain, the motors 19 and 24 are de-energised. Owing to the irreversible nature of the worm/wormwheel drive to the member 11, therefore, the member 11 is locked in the position it occupied immediately prior to failure. The member 13 is displcaed by the spring 23 to cause the parts to take up the position shown in FIG. 4, to take control of the fuel control 20, the pilot must move the lever 15 to a datum position, i.e., the idling position and then back into the flight range until the coupling member 30 becomes fully engaged. Until such full engagement occurs the dog means 22 remains engaged so that the output member 13 is not turned by the pilots actions.

Thus it will be appreciated that manual control is taken without necessitating any change in engine speed.

I claim:

1. An actuator device for use in gas turbine engine fuel control, and comprising, in combination: a first angularly movable input member connected to a condition control lever for movement thereby, a second angularly movable input member connected to a speed control device for movement thereby, an angularly movable output member selectively connected to the first and second input member, dog means for interconnecting the second input member with the output member, resilient means acting on the second input member and the output member for urging the dog means out of interengagement and disconnecting the second input member and the output member, electromagnetic means for urging the dog means into interengagement and coupling means for interconnecting the first input member and the output member under the influence of said resilient means and arranged so that on de-energisation of the electromagnetic means when the output member is out of a datum position thereof the coupling means can be caused to be engaged to connect the output member to the first input member by turning of the first input in one direction to a datum position corresponding to the datum position of the output member and then turning the first input member in the opposite direction, and the arrangement being such that said dog means does not become fully disengaged until the first input member has been turned in said opposite direction to a position corresponding to the position of the output member.

2. An actuator device as claimed in claim 1 in which said coupling means comprises a dog on one member having flanks equally inclined to the plane of rotation of said one member, the other member having a slot with similarly inclined flanks coinciding with a step in such other member.

3. An actuator device as claimed in claim 2 in which the second input member is a wormwheel engaged by a worm provided on an electrical drive unit shaft.

4. An actuator device as claimed in claim 3 in which said electromagnetic means includes an electric motor, a reduction gear box and a pivoted member drivingly connected to the output of the gear box and acting on the dog means.

5. An actuator device as claimed in claim 1 in which the second input member is a wormwheel engaged by a worm provided on an electrical drive unut shaft.

6. An actuator device as claimed in claim 1 in which said electromagnetic means includes an electric motor, a reduction gear box and a pivoted member drivingly connected to the output of the gear box and acting on the dog means.

* * * * *